United States Patent
Jacobs et al.

(10) Patent No.: US 6,578,622 B2
(45) Date of Patent: Jun. 17, 2003

(54) CORE CAST MANIFOLD ASSEMBLY

(75) Inventors: John Jacobs, Leamington (CA); Michael Robert Morency, Windsor (CA)

(73) Assignee: Siemens VDO Automotive Inc., Chatham (CA)

(*) Notice: Subject to any disclaimer, the term of this patent is extended or adjusted under 35 U.S.C. 154(b) by 83 days.

(21) Appl. No.: 09/938,348

(22) Filed: Aug. 23, 2001

(65) Prior Publication Data

US 2002/0117289 A1 Aug. 29, 2002

Related U.S. Application Data

(60) Provisional application No. 60/271,519, filed on Feb. 26, 2001.

(51) Int. Cl.[7] .......................... B22D 37/00; B22D 41/08
(52) U.S. Cl. .................... 164/337; 164/335; 164/338.1; 222/591
(58) Field of Search .............................. 164/338.1, 337, 164/335, 133, 135, 136; 222/591, 590

(56) References Cited

U.S. PATENT DOCUMENTS

| | | | |
|---|---|---|---|
| 4,919,459 A | * 4/1990 | Miller ........................ 285/140 |
| 5,085,344 A | 2/1992 | Hintzen ....................... 222/590 |
| 5,106,106 A | 4/1992 | Bruckner et al. ........ 277/207 A |
| 5,227,179 A | * 7/1993 | Benenati ..................... 425/547 |
| 5,230,813 A | 7/1993 | Hintzen ....................... 222/599 |
| 5,290,507 A | * 3/1994 | Runkle ......................... 419/14 |
| 5,423,670 A | * 6/1995 | Hamel ......................... 425/144 |
| 5,478,230 A | * 12/1995 | McGrevy .................... 425/504 |
| 5,492,166 A | * 2/1996 | Liu et al. .................... 164/312 |
| 5,685,357 A | * 11/1997 | Kato et al. .................. 164/113 |
| 5,798,051 A | * 8/1998 | Hill ............................. 222/590 |
| 5,992,696 A | * 11/1999 | Schultz et al. ........... 222/146.2 |

\* cited by examiner

*Primary Examiner*—M. Alexandra Elve
*Assistant Examiner*—I. H. Lin

(57) ABSTRACT

A lost core molding assembly (20) according includes a manifold (22) which minimizes adherence between a molten alloy and the manifold. The manifold (22) receives a heated fluid from a source and circulates the heated fluid through a heated fluid passage (66.) The heated fluid passage (66) arrangement assures that the heated fluid maintains the molten alloy in an even molten condition thereby reducing degradation of the molten alloy prior to injection into the mold.

5 Claims, 4 Drawing Sheets

CORE CAST MANIFOLD ASSEMBLY

The present application claims priority to U.S. Provisional Patent Application Serial No. 60/271,519, filed Feb. 26, 2001.

BACKGROUND OF THE INVENTION

This invention relates generally to lost core molding machines and, more specifically, to a manifold assembly which minimizes degradation of the molten material chamber.

Conventional lost core molding processes require the use of a molding machine manifold to communicate a heated fluid within the manifold. The heated fluid within the manifold maintains the core cast material such as tin bismuth alloy in a molten state. The molten alloy can then be injected through a nozzle and into a mold tool.

The molten metal is a highly abrasive fluid. In some applications, the molten alloy that is used in the molding process causes conventional manifold fluid passageways and nozzles to deteriorate over a relatively short period of time thereby necessitating frequent maintenance. Further problems may be experienced if the manifold ineffectively or unevenly heats the molten alloy. Partially or unevenly heated alloy cools within the manifold passages. The cooled alloy expands and inhibits further flow of the alloy.

Accordingly, it is desirable to provide a lost core molding manifold which maintains even heat and flow of the core cast material such that maintenance requirements are decreased.

SUMMARY OF THE INVENTION

The lost core molding assembly according to the present invention provides for the improved the handling of the molten alloy and reducing mold assembly maintenance. A manifold is mounted to a mold to inject the molten alloy such as Tin Bismuth to a mold cavity therein. The manifold is preferably manufactured of a heat resistant steel such as T-15 steel which is a high speed steel with a tungsten additive. The T-15 steel minimizes adherence between the tin bismuth and manifold. Oxidation and build-up is thereby minimized and operation time between maintenance is improved.

The molten alloy is received into the manifold at an alloy input from an alloy source.

The manifold directs the molten alloy to the nozzles where it is then injected into the mold cavity.

The manifold receives a heated fluid from a source and circulates the heated fluid through a heated fluid passage. The present invention provides a heated fluid passage arrangement which assures that the heated fluid maintains the molten alloy in an even molten condition thereby reducing degradation of the molten alloy prior to injection into the mold.

The present invention therefore provides a lost core molding manifold which maintains even heat and flow of the core cast material such that maintenance requirements are decreased.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
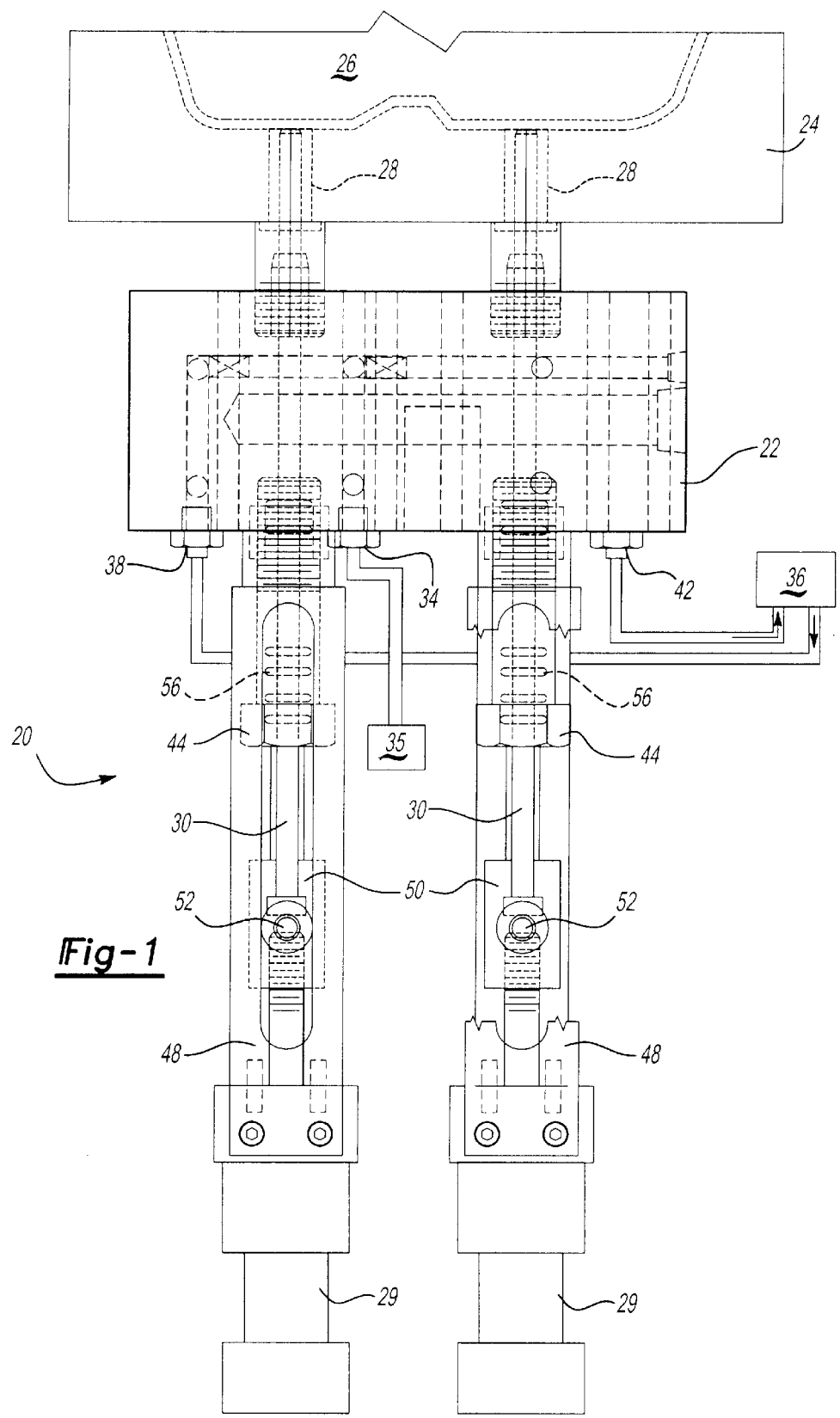
FIG. 1 is a general perspective view of a lost core molding assembly according to the present invention.

FIG. 1 schematically illustrates a lost core molding assembly 20. As is known, lost core molding systems cast alloy plugs that are then moved to an injection mold where plastic is injected around the alloy plug. This invention is directed to improving the handling of the molten alloy and reducing mold assembly maintenance.

A manifold 22 is mounted to a mold 24 to inject the molten alloy such as Tin Bismuth to a mold cavity 26 therein. The manifold is preferably manufactured of a heat resistant steel such as T-15 steel which is a high speed steel with a tungsten additive. The T-15 steel minimizes adherence between the tin bismuth and manifold 22. Oxidation and build-up is thereby minimized and operation time between maintenance is improved.

Figure 2:
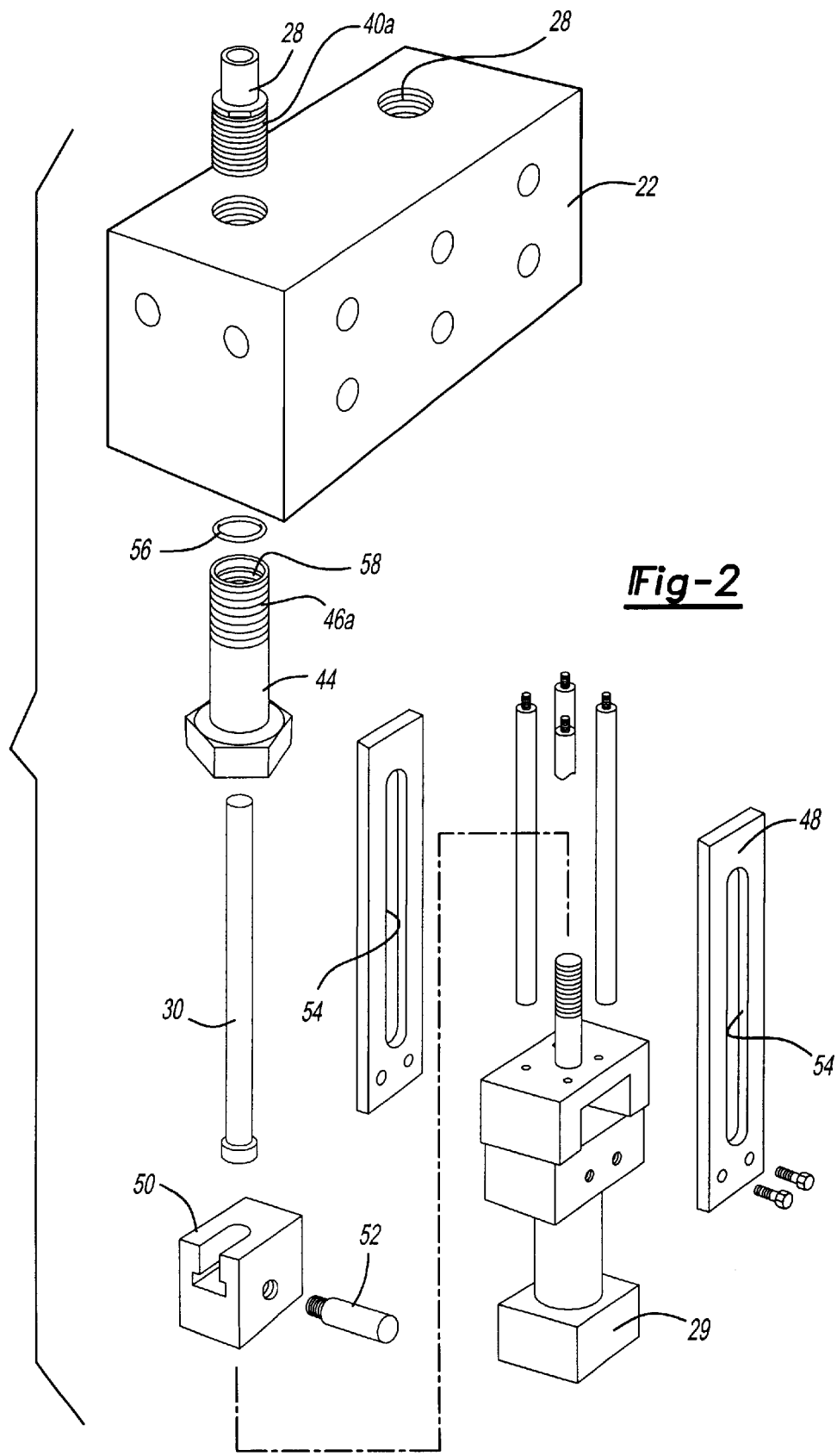
FIG. 2 is an exploded view of a manifold of the lost core molding assembly of FIG. 1.

The manifold 22 includes at least one and preferably two removable nozzles 28, which selectively communicate with the mold cavity 26. The nozzles 28 preferably include a threaded portion 40a such that the nozzles 28 are threadably engagable with corresponding manifold threads 40b (FIG. 2). Accessibility to the internal passageways within the manifold 22 is also improved. The nozzle 28 are opened and closed by a movable pin 30. A conventional hydraulic actuator 29, which is positioned outside of the manifold 22, moves the pin 30 in a controlled manner.

The molten alloy is received into the manifold 22 at an alloy input 34 from an alloy source (illustrated schematically at 35.) The manifold 22 directs the molten alloy to the nozzles 28 where it is then injected into the mold cavity 26.

The manifold 22 receives a heated fluid from a source (illustrated schematically at 36) at an input port 38. The heated fluid circulates through a heated fluid passage (FIG. 4) within the manifold 22 and is output though an output port 42. From the output port 42 the heated fluid is returned to its source 36. As will be further described below, the arrangement of the heated fluid passage assures that the heated fluid maintains the molten alloy in an even molten condition thereby reducing degradation of the molten alloy prior to injection into the mold 24.

Referring to FIG. 2, the manifold 22 includes a gland nut 44 opposite each nozzle 28. The gland nut 44 preferably includes a threaded portion 46a such that the gland nut is threadably engagable with corresponding manifold threads 46b. The gland nut 44 is thus readily removed to provide for periodic maintenance of the gland nut 44 and manifold 22. Accessibility to the internal passageways within the manifold 22 is also improved.

Supports 48 extend from the manifold 22 to mount the actuator 29. A yoke 50 interconnects the actuator 29 to the pin 30 and is movable along the supports 48. Preferably, an alignment pin 52 extends from the yoke 50. The alignment pin 52 is movable within a slot 54 in the supports 48. Movement of the yoke 50 by the actuator 29 is thereby travel and rotation limited by interaction between the pin 52 and slot 54. To assure an effective seal between the movable pin 30 and the gland nut 44, seals 56 such as O-rings are located about a through aperture 58 within the gland nut 44.

Figure 3:
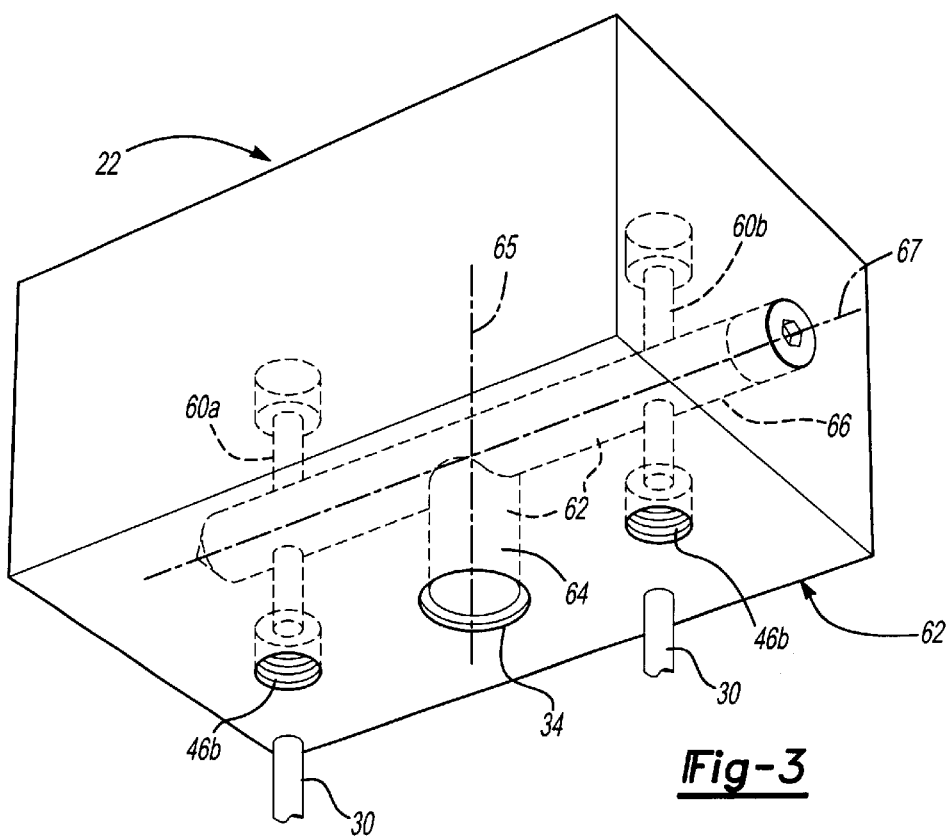
FIG. 3 is an expanded phantom view of the manifold according to the present invention illustrating the molten alloy passageways.

Referring to FIG. 3, the internal alloy passageways of the manifold 22 are illustrated. Main chambers 60a,60b interconnect each nozzle 28 and gland nut 44. The main chambers 60a,60b communicate with the molten alloy input port 34 through an alloy passage 62. Alloy passage 62 is preferably a substantially T-shaped alloy passage 62 having a central alloy passageway 64 which defines a central manifold axis 65 and which communicates with the alloy input port 34. A substantially longitudinal alloy passageway 66 intersects the central alloy passageway 64 and each main chamber 60a,60b. Most preferably, the alloy passage 62 is symmetrical. Alloy is therefore fed equally from the central alloy passageway 64 to each main chamber 60a,60b.

Figure 4:
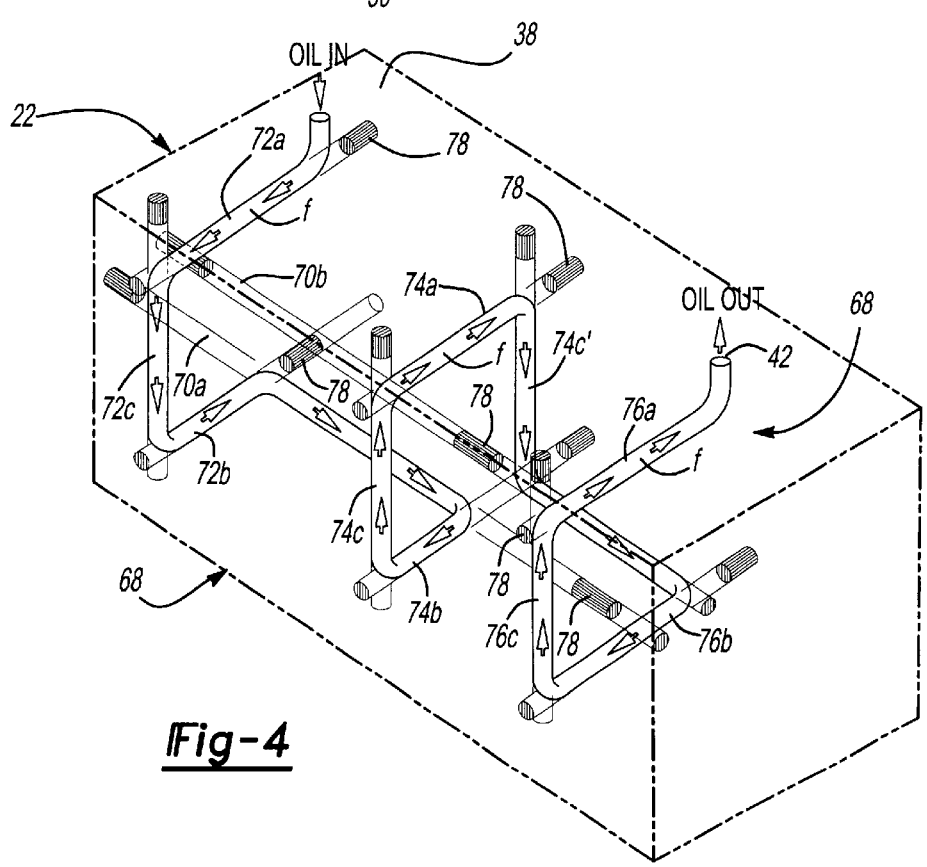
FIG. 4 is an expanded phantom view of the manifold according to the present invention illustrating the heated fluid passageways.
Figure 5:
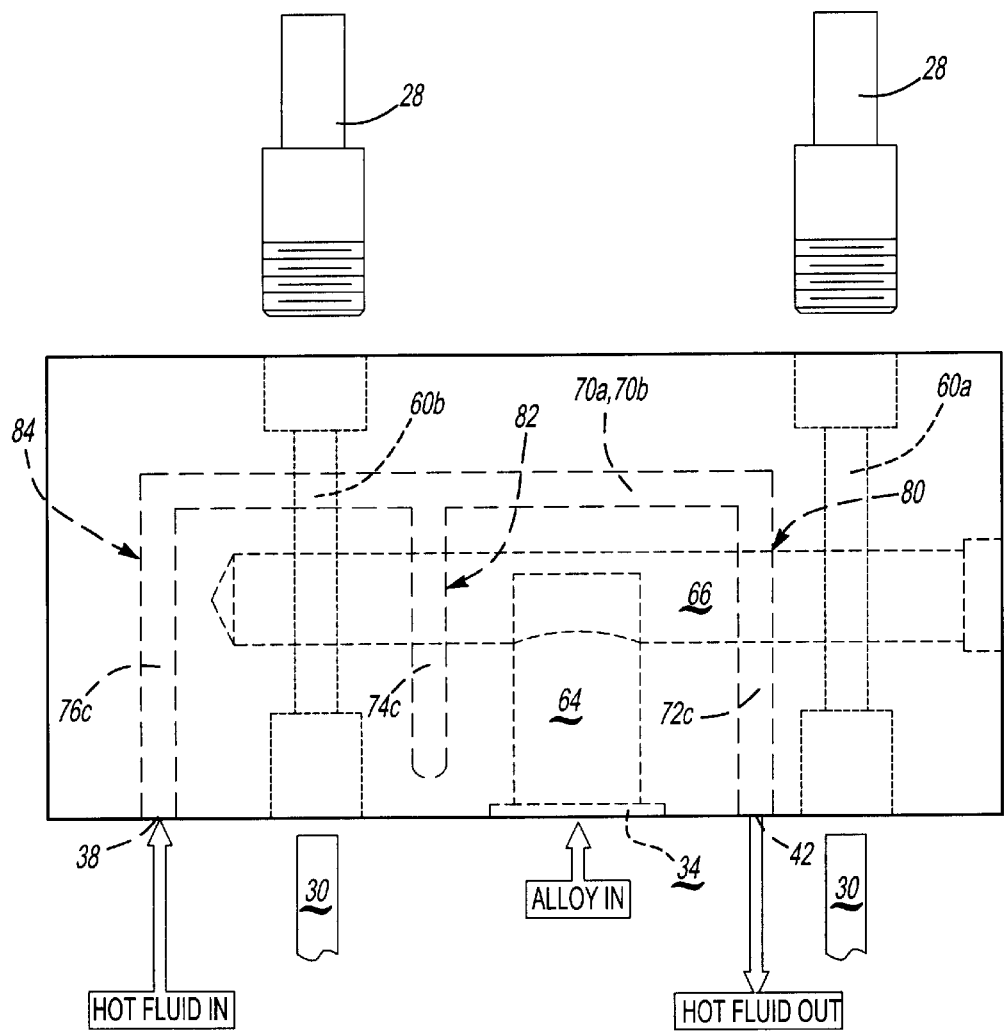
FIG. 5 is an expanded phantom side view of the manifold according to the present invention illustrating the relationship between the molten alloy passageways and the heated fluid passageways

Referring to FIG. 4, the internal heated fluid passageways of the manifold 22 are illustrated. Main chambers 60 and passages 62 are heated by a heated fluid passage 66 which communicate heated fluid from the heated fluid input port 38 through the manifold 22 and out the heated fluid output port 42. Importantly, the heated fluid passageways 64 assure that the molten alloy within main chambers 60 and alloy passage 62 are maintained at a predetermined temperature. Proper flow and minimal degradation of the alloy is thereby achieved.

The heated fluid passage 68 include a first and second longitudinal heated fluid passageway 70a, 70b. Three pairs of lateral heated fluid passageways 72a, 72b, 74a, 74b and 76a, 76b extend through the manifold 22 and are arranged substantially perpendicular to the first and second longitudinal heated fluid passageway 68, 70. Interconnecting heated fluid passageways 72c, 74c, 76c and 74c' are arranged substantially parallel to the heated fluid input port 38 and the heated fluid output port 42, interconnecting heated fluid passageway 72c, intersects lateral heated fluid passageways 72a, 72b; interconnecting heated fluid passageways 74c and 74c', intersect lateral heated fluid passageways 74a, 74b; and interconnecting heated fluid passageway 76c, intersects lateral heated fluid passageways 76a, 76b.

The heated fluid passage 68 is preferably gun drilled through the manifold 22 and a multiple of plugs 78 are located in the passageways to direct the heated fluid through the passageways. The plugs 78 are preferably friction fit into the passageways such that the plugs 78 may be removed for maintenance or the like.

A preferred heated fluid communication circuit (schematically illustrated by arrows f) will now be described. From the heated fluid from a source 36 (FIG. 1,) heated fluid enters the input port 38, the heated fluid travels through the lateral heated fluid passageways 72a and into the interconnecting heated fluid passageway 72c. From the interconnecting heated fluid passageway 72c, the heated fluid travels through the lateral heated fluid passageways 72b and enters the first longitudinal heated fluid passageway 70a. From the first longitudinal heated fluid passageway 70a the heated fluid travels through the lateral heated fluid passageways 74b and into the interconnecting heated fluid passageway 74c. From the interconnecting heated fluid passageway 74c, the heated fluid travels through the lateral heated fluid passageway 74a and into the interconnecting heated fluid passageway 74c'. From the interconnecting heated fluid passageway 74c', the heated fluid enters the second longitudinal heated fluid passageway 70b travels though the lateral heated fluid passageways 76b and enters the interconnecting heated fluid passageway 76c. From the interconnecting heated fluid passageway 76c the heated fluid travels through the lateral heated fluid passageways 76a and exits the heated fluid output port 42 where it returns to the heated fluid from a source 36 (FIG. 1).

Preferably, the heated fluid passage 68 is arranged such that one set of heated fluid passageways (passageways 72a, 72b, 72c) are between one main chamber 60a and the central alloy passageway 64, while two sets of heat fluid passageways (passageways 74a, 74b, 74c, 74c' and 76a,76b, 76c) are on opposite sides of the other main chamber 60b. It should be understood that the term "set" is a sequence of passageways and should be interpreted as two or more connected passageways but not necessarily requiring an equivalent number of passageways in each "set." The first set (passageways 72a, 72b, 72c) and third set (passageways 76a, 76b, 76c) preferably form a substantially U-shape as viewed along the first and second longitudinal heated fluid passageway 70a, 70b.

As the heated fluid is at a higher temperature near the input port 38 than the output port 42, one of the main chambers 60a is adjacent higher temperature heated fluid while the other main chamber 60b is adjacent slightly cooler heated fluid. The two sets of heat fluid passageways (passageways 74a, 74b, 74c, 74c' and 76a,76b, 76c) thereby circulate adjacent the second main chamber 60b to compensate for the lower temperature heated fluid. An even heating of the manifold 22 is thereby provided. It should be understood that other heated fluid paths, which evenly heats the manifold and T-shaped alloy passage 62, would also benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A lost core molding assembly comprising:
  a manifold defining a substantially T-shaped alloy passage having a central alloy passageway in communication with a first and a second main chamber each chamber having an upper portion and a lower portion, and a heated fluid passage having three sets of heated fluid passageways to communicated a heated fluid through said manifold to heat said central alloy passageway;
  a heated fluid input port communicating with a first of said three sets of heated fluid passageways;
  a heated fluid output port communicating with a third of said three sets of heated fluid passageways;
  a first and second nozzle respectively communicating with each upper portion of said first and second main chambers;
  a first and second nozzle gland nut respectively communicating with each lower portion of said first and second main chambers, said first nozzle opposite said first gland nut relative to said first main chamber and said second nozzle opposite said second gland nut relative to said second main chamber;

a first moveable pin moveable through said first gland nut to seal said first nozzle and a second moveable pin moveable through said second first gland nut to seal said second nozzle.

2. The lost core molding assembly as recited in claim 1, further including an alloy input in communication with said central alloy passage, said ally input located on a side of said manifold having said heated fluid input port and said heated fluid output port.

3. The lost core molding assembly as recited in claim 1, wherein a first of said multiple sets of heated fluid passageways is adjacent said first main chamber and two of said multiple sets of heated fluid passageways is adjacent said second main chamber.

4. The lost core molding assembly as recited in claim 1, wherein a first of said multiple sets of heated fluid passageways is between said first main chamber and said central alloy passageways, a second of said multiple sets of heated fluid passageways is between said second main chamber and said central alloy passageway, and a third of said multiple sets of heated fluid passageways is adjacent said second main chamber opposite said second of said three sets of heated fluid passageways.

5. The lost core molding assembly as recited in claim 1, wherein said manifold is manufactured of a high speed steel with a tungsten additive.

* * * * *